United States Patent [19]

Hou et al.

[11] Patent Number: 4,980,067

[45] Date of Patent: * Dec. 25, 1990

[54] POLYIONENE-TRANSFORMED MICROPOROUS MEMBRANE

[75] Inventors: Kenneth C. Hou, South Glastonbury; Chung-Jen Hou, South Windsor; Haunn-Lin Chen, Darien, all of Conn.

[73] Assignee: Cuno, Inc., Meriden, Conn.

[ * ] Notice: The portion of the term of this patent subsequent to Dec. 13, 2005 has been disclaimed.

[21] Appl. No.: 276,831

[22] Filed: Nov. 28, 1988

Related U.S. Application Data

[63] Continuation-in-part of Ser. No. 758,064, Jul. 23, 1985, Pat. No. 4,791,063.

[51] Int. Cl.$^5$ .............................................. B01L 69/00
[52] U.S. Cl. ...................................... 210/638; 210/490; 427/245
[58] Field of Search .................. 210/638, 500.38, 490; 427/244, 245, 246; 435/240, 243, 256.1, 254, 287; 526/238.2

[56] References Cited

U.S. PATENT DOCUMENTS

| | | | |
|---|---|---|---|
| 2,261,002 | 10/1941 | Ritter | 260/29.2 |
| 2,271,378 | 1/1942 | Searle | 260/9 |
| 2,926,116 | 2/1960 | Keim | 162/164 |
| 2,926,154 | 2/1960 | Keim | 260/29.2 |
| 3,224,986 | 12/1965 | Butler | 260/9 |
| 3,311,594 | 3/1967 | Earle, Jr. | 260/77.5 |
| 3,332,901 | 7/1967 | Keim | 260/29.2 |
| 3,382,096 | 5/1968 | Boardman | 117/139.5 |
| 3,489,663 | 1/1970 | Bayer | 260/29.2 |
| 3,556,305 | 1/1971 | Shorr | 210/490 |
| 3,556,992 | 1/1971 | Massucco | 210/23 |
| 3,642,668 | 2/1972 | Bailey et al. | 260/25 M |
| 3,761,350 | 9/1973 | Munjat et al. | 162/164 |
| 3,784,649 | 1/1974 | Buckman et al. | 264/41 |
| 3,808,305 | 4/1974 | Gregor | 264/331 |
| 3,876,738 | 4/1975 | Marinaccio et al. | 264/41 |
| 3,898,188 | 8/1975 | Rembaum et al. | 210/22 R |
| 3,910,819 | 10/1975 | Rembaum et al. | 435/240.243 |
| 3,927,242 | 12/1975 | Rembaum et al. | 210/638 |
| 3,928,517 | 12/1975 | Knight et al. | 264/38 |
| 4,013,507 | 3/1977 | Rembaum | 210/638 |
| 4,038,318 | 7/1977 | Tai | 162/164 |
| 4,046,750 | 9/1977 | Rembaum | 210/490 |
| 4,075,136 | 2/1978 | Schaper | 264/41 |
| 4,113,627 | 9/1978 | Leason | 264/41 |
| 4,125,462 | 11/1978 | Latty | 210/500.2 X |
| 4,148,732 | 4/1979 | Burrow et al. | 264/41 |
| 4,159,954 | 7/1979 | Gangemi | 264/41 |
| 4,170,056 | 10/1979 | Meyst et al. | 162/164 |
| 4,203,847 | 5/1980 | Grandine | 210/490 |
| 4,203,848 | 5/1980 | Grandine | 210/490 |
| 4,247,498 | 1/1981 | Castro | 264/44 |
| 4,250,029 | 2/1981 | Kiser et al. | 210/638 |
| 4,305,782 | 12/1981 | Ostreicher et al. | 162/181 C |
| 4,340,479 | 7/1982 | Pall | 210/500.38 |
| 4,361,486 | 11/1982 | Hou et al. | 210/638 |
| 4,411,795 | 10/1983 | Olson | 210/679 |
| 4,431,545 | 2/1984 | Pall et al. | 210/500.38 X |
| 4,444,661 | 4/1984 | Jackson et al. | 264/49 |
| 4,473,474 | 9/1984 | Ostriecher et al. | 210/638 |
| 4,473,475 | 9/1984 | Barnes, Jr. et al. | 264/49 |
| 4,791,063 | 12/1988 | Hou et al. | 526/238.2 X |

FOREIGN PATENT DOCUMENTS

WO83/04186 12/1983 World Int. Prop. O. .

OTHER PUBLICATIONS

Hou et al., Applied and Environmental Microbiology, vol. 40, (1980), pp. 892–896.
Daniels, S. L., Developments in Industrial Microbiol., 13:211 (1972), pp. 211–253.
Zvyagintsev et al., *Mikrobiologiya* 40:123–126 (1971).

*Primary Examiner*—Frank Spear
*Attorney, Agent, or Firm*—Weingram & Zall

[57] ABSTRACT

A microporous membrane modified by coating or grafting thereon a polyionene material. The thus-modified microporous membrane is useful for separating microorganism-originated contaminants from biological liquids.

29 Claims, No Drawings

POLYIONENE-TRANSFORMED MICROPOROUS MEMBRANE

This application is a continuation-in-part application to copending application U.S. Ser. No. 758,064 filed on July 23, 1985, to be issued on Dec. 14, 1988 as U.S. Pat. No. 4,791,063 entitled "Polyionene-Transformed Modified Polysaccharide Supports". This application is identical to U.S. Ser. No. 758,036 filed July 23, 1985 entitled "Polyionene-Transformed Microporous Membrane", now abandoned. The entire disclosures of these applications are incorporated herein by reference.

BACKGROUND OF THE INVENTION

1. Field of the Invention

This invention relates to microporous membrane modified by or having bonded thereto ionene polymer and the use of the polyionene-transformed microporous membrane for the separation of contaminants of microorganism origin from biological liquids.

2. Brief Description of the Background Art

Removal of microorganism-originated contaminants from biological liquids has long been a recalcitrant problem. Examination of bacterial cell wall surface properties has demonstrated that both gram-positive and gram-negative bacteria are negatively charged, mainly due to an excess of carboxyl and phosphate groups in the cell walls thereof. Gram-positive bacteria contain both teichoic and teichuronic acids in their cell walls, whereas gram-negative organisms have phospholipids and the negatively lipid A portion of lipopolysaccharides as components of their outer cell membranes. In aqueous environments, the cell membrane exists as a continuum of lipid and protein organized as a molecular double layer, with the hydrophobic portions of the lipid molecules being opposed and the hydrophilic group projecting outwardly into the aqueous phase. Phosphoglycerides account for about half the lipid with polar groups, such as glycerol, serine, and carboxyl, providing the hydrophilic components. While various protein forms are imbedded in the lipid, the major determinants of charge are surface polysaccharides covalently linked to the membrane protein and lipids.

The effectiveness of bacteria removal through charge interaction has been previously demonstrated, for example, by Ostreicher et al., U.S. Pat. No. 4,305,782. Capture of bacteria, endotoxins, and viruses by charge modified filters are described in *Applied and Environmental Microbiology*, 40: 892-896 (1980). Positively charged ion exchange resins have been utilized for bacteria adsorption (Daniels, S. L., *Development and Industrial Microbiology*, 13: 211-253 (1972)).

Olson et al., U.S. Pat. No. 4,411,795 describes a variety of polymers attached to substrates including nylon and recognized that the combined effect of hydrophilic and ionic binding enhances adsorption of lipin-containing cells.

Zvaginstev, D. G. et al., Mikrobiologiya 40: 123-126 (1971), concluded that adsorption of bacterial cells by ion exchange resins was attributable to electrostatic attraction between quaternary ammonium groups on the resin surface and carboxyl groups on the bacteria cell surface. Hogg, in his Ph.D. thesis for the University of Salford, England (1976), demonstrated the interaction of bacteria with cellulose-based DEAE. The adsorption of several gram-negative organisms was shown, including *Escherichia coli, Salmonella typhimurium*, and *Pseudomonas aeruginosa*.

The major forces impacting on bacterial adhesion to solid surfaces have been summarized by Rutter, P. R. in "The Physical Chemistry of the Adhesion of Bacteria and Other Cells," *Microbial Adhesion to Surfaces*, Editors Berkley et al., Ellis Howard Ltd. Publishers, West Sussex, England (1980). According to Rutter, the Van der Walls force and charge interaction may be considered as long range forces. Where the distance between bacteria and solid surfaces are short, other interactions must be taken into account, for example, ion-dipole, dipole-dipole, hydrogen bonding, etc. The short range effects are particularly important in aqueous systems. When the bacteria particles approach the microscopic solid surface, the local ordered water structure near the surface must be broken down. This leads to a short range repulsion force, which may be sufficient to prevent the bacteria from coming closer to the solid surface. On the other hand, when both the surfaces involved are hydrophobic, the short range interaction is a net attraction. This energy favorable process, called "hydrophobic interaction," is the basis for the well-known high performance liquid chromatography applied in protein separations. As is known, a hydrocarbon chain of optimum length, when attached covalently to a solid matrix, may adsorb one protein in preference to another due to the difference in hydrophobicity between proteins.

However, an overly strong hydrophobic solid surface may uncoil the protein structure leading to the exposure of hydrophobic regions and increase tendency for hydrophobic interaction. If the uncoiling is too extensive, denaturation of the protein may result.

In most of the practical applications for bacteria and endotoxin inactivation and removal from biological and pharmaceutical products, protein contamination by bacteria is the most prevalent problem. One must be able to inactivate and remove the microorganism-originated contaminants from protein specifically without causing loss or denaturation of the final products. Accordingly, an optimal solid matrix should exhibit a hydrophobic force which just matches the surface hydrophobicity of proteins and maximally exploits these selected differences.

Thus, a need has continued to exist for a solid matrix for removal of microorganism-originated contaminants from biological and pharmaceutical products which will effectively eliminate the contaminants without denaturing the final product.

Microporous membranes and their use for sterile filtration are well-known in the art. U.S. Pat. No. 3,876,738 to Marinaccio et al. describes a process for preparing a microporous membrane. U.S. Pat. No. 4,340,479 to Pall describes a similar process. Additional processes for producing microporous membranes are described in U.S. Pat. No. 3,642,668 to Bailey et al.; U.S. Pat. No. 4,203,847 to Grandine, II; U.S. Pat. No. 4,203,848 to Grandine, II; and U.S. Pat. No. 4,247,498 to Castro.

Commercially available microporous membranes, for example, made of nylon, are available from Pall Corporation, Glen Cove, N.Y., under the trademark ULTIPORE $N_{66}{}^R$. Another commercially significant membrane made of polyvinylidene fluoride is available from Millipore Corp., Bedford, Mass., under the trademark DURAPORE ®. Each of the above membranes is advertised as useful for filtration of pharmaceuticals for removal of microorganisms and the like.

Efforts to improve the bacterial retention of various microporous membranes has resulted in charge modification of various microporous membranes. Assignee's U.S. Pat. No. 4,473,474 to Ostreicher et al. describes a particularly preferred charge-modified microporous membrane wherein the membrane, preferably nylon, comprises a multiplicity of cationic charge sites on the internal pore surfaces. The charge sites are provided by a cationic charge-modifying resin, in particular a polyamido-polyamine epichlorohydrin resin, bonded to the membrane structure. The membrane may be further provided with a cross-linking agent for the charge modifying resin which is effective in retaining the resin on the membrane. This membrane is sold under the trademark ZETAPOR ® by AMF Cuno, Meriden, Conn. A substantial advantage to the charge-modified microporous membranes known to the prior art resides in the action of exclusion of particulate on the basis of charge as well as size. Thus, for example, viruses may be removed from fluid without having to go to an ultrafiltration membrane with its associated high pressures. One problem encountered by such prior art membranes, specifically the aforementioned ZETAPOR ® cationically modified nylon membrane is the extremely slow flush out characteristic which prevents the use of such charoe-modified media for certain applications.

As an improvement upon the ZETAPOR ® membrane described above, assignee obtained U.S. Pat. No. 4,473,475 to Barnes, Jr. et al., a patent disclosing a cationic charge-modified microporous membrane. The membrane comprises a hydrophilic organic polymeric microporous membrane having bonded thereto, through a cross-linking agent, a charge modifying amount of a cationic charge-modifying agent. The charge-modifying agent is an aliphatic amine or polyamine; the cross-linking agent is an aliphatic polyepoxide; the preferred microporous membrane is nylon.

Hou et al., U.S. Pat. No. 4,361,486, discloses a bactericidal filtration media which comprises an amount of metal peroxide immobilized in a substantially inert porous matrix.

However, in spite of continued efforts to improve the separation characteristics of such microporous membranes for the removal of microorganism-originated contaminants from biological liquids, "bacterial breakthrough" remains an enduring problem. One explanation for this phenomenon resides in the fact that bacteria, although retained on the separation membrane, continue to grow and multiply thereon. Subsequently, when the bacterial population becomes of sufficient size, bacterial contamination of the biological liquids flowing therethrough results. Thus, a need has continued to exist for microporous membrane having the capability of high efficiency separation of microorganism-originated contaminants from biological liquids.

Additionally, ion rejecting membranes are known. U.S. Pat. No. 4,125,462 to Latty describes a coated membrane having a layer or coating of a cationic polyelectrolyte, preferably poly(vinylimidazoline) in the bisulfate form. Other types of charge-modified membranes are described in U.S. Pat. No. 3,556,992 to Massucco; U.S. Pat. No. 3,556,305 to Shorr; U.S. Pat. No. 3,808,305 to Gregor; and U.S. Pat. No. 4,250,029 to Kisset et al.

Poly-quaternary ammonium polymeric polyelectrolytes are known to the prior art; these polymeric compositions are produced by the polymerization of a dihalide and a ditertiary amine. These polymers are characterized by high charge density and have found substantial utility as flocculants in the clarification of residential and industrial water supplies, as catalysts in pigment retention additives, and as geling agents. These polyelectrolyte materials are also known to be useful in the rheological modification of fluids such as friction reducers, as dispersants for clay and sludge in both aqueous and oil-based systems, as anti-static agents, and as additives to cosmetics, textile finishes and lubricating oils. The materials are known to exhibit germicidal action or effective bactericidal and fungicidal agents. See Rembaum et al., U.S. Pat. No. 3,898,188.

Buckman et al., U.S. Pat. No. 3,784,649, discloses "high molecular weight" ionene polymeric compositions for utility, among others, as broad spectrum microbicides for efficient control of bacteria including sulphate reducers, fungi, algae, and yeast. The Buckman et al. polyionenes are suggested as additives to paper making systems, the polyionenes increasing production per unit of equipment, improving formation and strength properties of paper and paper board, and alleviating water pollution problems.

Rembaum, U.S. Pat. No. 4,046,750, discloses ionene modified beads for use in binding small and large anionic compounds. The bead substrates are formed by the aqueous copolymerization of a substituted acrylic monomer and a cross-linking agent. The formed polymeric beads are reacted with a mixture of a ditertiary amine and a dihalide or with a dimethylaminoalkyl halide to attach ionene segments to the halo or tertiary amine centers on the beads. The thus-formed polyionene-modified beads find use in affinity or pellicular chromatography for removal of heparin from its mixture with polycations or neutral substances such as proteins or serums. Further disclosed utilities include use of the modified beads in the separation of cholesterol precursors such as bile acid from bile micellar suspensions, for binding RNA or DNA irreversibly, and a variety of other utilities which depend upon the binding characteristics of the polycationic nature of the polyionene.

Rembaum, U.S. Pat. No. 4,013,507, discloses ionene polymers which bind negatively charged mammalian cells such as malignant cells for selectively inhibiting the growth in vitro thereof. Conversely, U.S. Pat. No. 3,910,819 to Rembaum et al. discloses the use of polyionene-coated containers for increasing the rate of cell growth.

U.S. Pat. No. 3,927,242 to Rembaum et al. discloses the use of polyionenes as coatings for paper substrates. Further disclosed are substrates coated with the polyelectrolyte to maximize the bactericidal activity of the polyionene. Suggested utilities include the impregnation of gauze material to form an antiseptic coagulant, germicidal dressing material.

U.S. Pat. No. 4,075,136 to Schaper discloses a class of ionene polymers which contain certain functional groups such as nitriles, acrylates, vinyl acetates, ketones, acrolein, acrylamides, methosulfates, sulfonic acids, pyridines, and pyrrolidones. A host of utilities are disclosed, including the use of the functional ionene polymers as biocides and as functional coatings on paper, for example, electroconductive, adhesive and photosensitive coatings.

However, prior to the present invention, the use of polyionenes to transform and improve the capture and inactivation of contaminants of microorganism origin has not been appreciated.

SUMMARY OF THE INVENTION

The present invention has resulted from the recognition that current separation techniques and materials for removing microorganism-originated contaminants such as viruses, bacteria, and endotoxins from biological liquids have not met the current need.

Massive blood loss is a major cause of morbidity and mortality from trauma and surgical misadventures. Large quantities of blood necessary to replace that blood lost by the victim are not always available and the blood lost from the victim may be contaminated and unsuited for re-infusion. While a wide range of bacteria may be removed from saline solutions by adsorption to the surface of charged membranes of a pore size greater than the bacteria, selective electrostatic binding of bacteria in the presence of whole blood is complicated by the presence in blood of various particles such as proteins and red blood cells with the same charge as the bacteria competing for binding sites.

Further, as discussed above, bacterial build-up on the separating membrane has resulted in a phenomenon known as "bacterial breakthrough."

The present inventors have postulated that the transformation of conventional microporous membrane with polyionene-type compositions has the potential to improve the effectiveness of the membranes if a polyionene could be developed which combined the appropriate range of hydrophobicity and charge characteristics, while, at the same time, was suitable for immobilization on a substrate. However, an essential problem that had to be overcome involved the conversion of the polyionenes from liquid to solid form without destroying the efficacy as bacterial adsorbents. Further, in order to fully utilize the chemical functionality of polyionenes as a biocidal or adsorbing composition, it was necessary to produce polyionenes having a molecular weight sufficient to minimize leaching off of the substrate, effect the proper balance of hydrophobic and charged groups for bacterial adsorption, insert coupling groups into the structure of the bio-adsorptive polyionene to permit its coupling to the substrate surface, and avoid distortion of the structure conformation in order that the polyionene maintain its functionality after binding to the substrate.

These efforts have culminated in the development of the present invention, a modified microporous membrane comprising a polyionene-transformed hydrophilic organic polymeric microporous membrane. The membranes of the present invention find utility for separating microorganism-originated contaminants from biological liquids.

DESCRIPTION OF THE PREFERRED EMBODIMENTS

The modified microporous membrane of this invention is produced from a hydrophilic organic polymeric microporous membrane. Such membranes are well-known in the art.

The term "microporous membrane" as used herein is meant to include a substantially symmetrical, isotropic porous membrane having a pore size of at least 0.05 microns or larger or an initial bubble point (IBP), as that term is used herein, in water of less than 120 psi. A maximum pore size useful for this invention is about 1.2 microns or an IBP of greater than about 10 psi. By "symmetrical" is meant that pore structure which is substantially the same on both sides of the membrane. By the use of the term "isotropic" is meant that membrane which has a uniform pore structure throughout the membrane.

The use of the term "hydrophilic" in describing the microporous membrane is meant to include those membranes which adsorb or absorb water. Generally, such hydrophilicity is produced by a sufficient amount of hydroxyl, carboxyl, amino, and/or similar functional groups on the surface of the membrane. Such groups assist in the adsorption and/or absorption of the water onto the membrane.

A preferred microporous membrane is one produced from nylon. The term "nylon" is meant to include film forming polyamide resins, including copolymers and terpolymers, which include the recurring amido grouping.

While the various nylon or polyamide resins are all copolymers of a diamine and dicarboxylic acid, or homopolymers of a lactam of an amino acid, such nylons or polyamide resins vary widely in crystallinity or solid structure, melting point, and other physical properties. Preferred nylons for use in this invention are copolymers of hexamethylene diamine and adipic acid (nylon 66), copolymers of hexamethylene diamine and sebacic acid (nylon 610), and homopolymers of poly-o-caprolactam (nylon 6).

These preferred polyamide resins have a ratio of methylene ($CH_2$) to amide (NHCO) groups within the range of about 5:1 to about 8:1, most preferably about 5:1 to 7:1. Nylon 6 and Nylon 66 each have a ratio of 6:1, whereas nylon 610 has a ration of 8:1.

The nylon polymers are available in a wide variety of grades which vary appreciably with respect to molecular weight, within the range from about 15,000 to about 42,000, and in other characteristics.

The highly preferred species of the units composing the polymer chain is polyhexamethylene adipamide, i.e. nylon 66, and molecular weights in the range above about 30,000 are preferred. Polymers free of additives are generally preferred, but the addition of antioxidants or similar additives may have benefit under some conditions.

The preferred membrane substrates are produced by the method disclosed in U.S. Pat. No. 3,876,738 to Marinaccio et al., and U.S. Pat. No. 4,473,474 to Ostreicher et al., both assigned to AMF, Inc. Another method of producing such membranes is described in U.S. Pat. No. 4,340,479 to Pall. The entire disclosures of these references are incorporated herein by reference.

Additionally, any of the hydrophilic microporous membranes commercially available, for example, Pall Corp.'s ULTIPORE $N_{66}$ $^R$ (nylon) Millipore's DURAPOR ® (polyvinylidene fluoride), and cellulose acetate/nitrate membranes produced by numerous companies, having characteristics potentially suitable for fine filtration of fluids, are suitable for treatment in accordance with this invention.

The conversion of the polymer into a microporous membrane may be conducted by methods described in the art, but, in particular, the methods described in U.S. Pat. No. 3,876,738 to Marinaccio et al. and U.S. Pat. No. 4,473,474 to Ostreicher et al., each incorporated by reference herein. These processes developed a unique fine internal microstructure through the quench technique described therein, offering a superior substrate for separation.

These preferred nylon membranes are characterized by an isotropic structure, having a high effective surface area and a fine internal microstructure of controlled pore dimensions, with narrow pore size distribution and adequate pore volume. A representative 0.22 micrometer rated Nylon 66 membrane (polyhexamethylene adipamide) exhibits an initial bubble point of about 45–50 psi, a foam all-over point of about 50–55 psi, provides a flow of from 70–80 ml/min of water at 5 psi (47 mm diameter discs), has a surface area (BET nitrogen adsorption) of about 13 m$^2$/g and a thickness of about 4.5–4.75 mils.

The Marinaccio et al. process for producing membrane develops a unique fine internal microstructure through the quench technique described therein. Broadly, Marinaccio et al. produces microporous films by casting or extruding a solution of a film-forming polymer in a solvent system into a quenching bath comprised of a non-solvent system for the polymer. Although the non-solvent system may comprise only a non-solvent, the solvent system may consist of any combination of materials provided the resultant non-solvent system is capable of setting a film and is not deleterious to the film. Examples of non-solvent systems may consist of materials such as water/salt, alcohol/salt, or other solvent/chemical mixtures. The Marinaccio et al. and Ostreicher et al. processes are especially effective for producing nylon films. More specifically, the general steps of the process involve first forming a solution of the film-forming polymer, casting the solution to form a film and quenching the film in a bath which includes a non-solvent for the polymer.

Ostreicher et al. disclose a cationic charge-modified microporous membrane wherein the membrane comprises a hydrophilic organic polymeric microporous membrane such as that produced by the process of Marinaccio et al., supra, and a charge-modifying amount of a primary cationic charge-modifying agent bonded to or modifying substantially all of the wetted surface of the membrane. The membrane is substantially symmetrical, i.e. the pore structure is substantially the same on both sides, is isotropic, and has a pore size of at least 0.05 microns. Included among the primary charge-modifying agents are a water-soluble organic polymer having a molecular weight of greater than about 1,000, having epoxide groups capable of bonding to the surface of the membrane along the polymer chain and tertiary amine or quaternary ammonium groups. In a preferred embodiment, a portion of the epoxy groups on the organic polymer are bonded to a secondary charge-modifying agent, the secondary charge-modifying agent selected from aliphatic amines having at least one primary amine or at least two secondary amines and aliphatic amines having at least one secondary amine and a carboxyl or hydroxyl substituent.

Preferred among the primary charge-modifying agents are the class of polyamido-polyamine epichlorohydrin-cationic resins such as those described in U.S. Pat. No. 2,926,116 to Keim; U.S. Pat. No. 2,926,154 to Keim; U.S. Pat. No. 3,224,886 to Butler et al.; U.S. Pat. No. 3,311,594 to Earle, Jr.; U.S. Pat. No. 3,332,901 to Keim; U.S. Pat. No. 3,382,096 to Boardman; and U.S. Pat. No. 3,761,350 to Munjat et al., the entire disclosures of each incorporated herein by reference. Preferred secondary charge-modifying agents include polyamines such as ethylene diamine, diethylene triamine, triethylene tetramine, and tetraethylene pentamine. Preferred aliphatic amines having at least one secondary amine and a carboxyl or hydroxyl substituent include gamma amino-butyric acid and 2-amino ethanol.

The nylon solutions which can be used in the Marinaccio et al. and Ostreicher et al. processes include solutions of certain nylons in various solvents, such as lower alkanols, e.g. methanol, ethanol, and butanol, including mixtures thereof. It is also known that other nylons will dissolve in solutions of acids in which said nylons behave as a polyelectrolyte, such solutions also being useful. Representative acids include, for example, formic acid, citric acid, acetic acid, maleic acid, and similar acids which react with nylons through proteination of nitrogen in the amide group characteristic of nylon.

The formation of the polymer film may be accomplished by many of the recognized methods familiar to the art. The preferred method is casting using a knife edge which controls the thickness of the cast film. The thickness of the film will be dictated by the intended use of the microporous product. In general, the films will be cast at thicknesses in the range of from about 1 mil to 20 mils, preferably from about 1 to about 10 mils.

Preferably, the polymer solution is cast and simultaneously quenched, although it may be desirable to pass the cast film through a short air evaporation zone prior to the quench bath. This latter technique is, however, not preferred.

Another similar method for the conversion of polymer in the microporous membrane is disclosed by the aforementioned U.S. Pat. No. 4,340,479 to Pall. As in Marinaccio et al., the Pall technique produces nylon membrane which are characterized by an isotropic structure having a high effective surface area and a fine internal microstructure of controlled pore dimensions with narrow pore size distribution and adequate pore volume. The entire disclosures of Marinaccio et al. and Pall are incorporated by reference herein.

Other microporous membrane suitable for the practice of this invention include the charge-modified microporous membranes such as those disclosed in U.S. Pat. 4,473,475 to Barnes, Jr. et al., the full disclosure incorporated by reference herein in its entirety.

Included among the cationic charge-modified microporous membranes disclosed in the Barnes, Jr. et al. patent mentioned above are the charge-modified microporous membranes wherein the membrane comprises a hydrophilic organic polymeric microporous membrane such as that produced by the process of Marinaccio et al., supra, said membrane having bonded thereto, through a cross-linking agent, a charge-modifying amount of a cationic charge-modifying agent. The charge-modifying agent is an aliphatic amine or polyamine, preferably tetraethylene pentamine, and the cross-linking agent is an aliphatic polyepoxide having a molecular weight of less than about 500, preferably 1,4-butanediol diglycidyl ether.

The term "polyionene" or "ionene-type polymeric composition," first coined by Rembaum, A. et al., *Polymer Letters*, 6: 159–171 (1968), has been adopted by other authors in the field, including *Chemical Abstracts*, as reported in U.S. Pat. No. 3,784,649. However, for the present invention, the term "polyionene" is meant to include those water-soluble polymers having polyquaternary ammonium groups separated by hydrophobic groups, said hydrophobic groups comprising aromatic groups or alkyl groups containing at least six carbon atoms.

The polyionenes of the present invention include those polymers having the following repeating units:

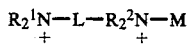

wherein $R^1$ and $R^2$ are $C_1$-$C_4$ alkyl; L is —$(CH_2)_n$—P—$(CH_2)_m$; M is —$(CH_2)_o$—Q—$(CH_2)_p$—, with P and Q being the same or different and representing at least one of $CH_2$, CHA, $C_6H_4$, pyridine, $C_6H_3A$, $C_6H_4$—CHA—$C_6H_4$, or $R^3C_6H_2A$; wherein A is a reactive group, typically hydroxy, amino, carboxy, epoxy, halide, or aldehyde; wherein $R^3$ is $C_1$-$C_4$ alkyl; and m, n, o and p representing integers from 1 to 20.

In general, polyione polymers are prepared by reacting a dihalo organic compound with a secondary or tertiary amine. Typical polymerization processes and reactants are described in U.S. Pat. No. 2,261,002 to Ritter; U.S. Pat. No. 2,271,378 to Earle; U.S. Pat. No. 3,489,663 to Bayer et al., U.S. Pat. No. 3,784,649 to Buckman et al.; and U.S. Pat. No. 4,038,318 to Tai. Additionally, Rembaum, at U.S. Pat. Nos. 3,898,188; 3,910,819; 3,927,242; and 4,013,507 describes other polyiones and their synthetic procedures. Each of the above-referenced U.S. patents is specifically incorporated in its entirety herein.

Typical dihalo organic compounds included within the scope of the present polyionene precursors include those compounds having the following general formula:

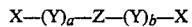

where X is I, Br, or Cl; Y represents a $CH_2$ group and/or a substituted $CH_2$ group wherein one of the hydrogens is replaced with a $C_1$-$C_4$ alkyl or hydroxy-substituted $C_1$-$C_4$ alkyl; and a and b independently represent integers varying from 1 to 10. Z represents $CH_2$, CHA, $C_6H_4$, pyridine, $C_6H_3A$, $C_6H_4$—CHA—$C_6H_4$, and $R^3C_6H_2A$, where $R^3$ represents $C_1$-$C_4$ alkyl and A is defined as above.

In one embodiment, Z represents a moiety as CHA, $C_6H_3A$ or $R^3C_6H_2A$, the presence of the A group providing a linking site for subsequent reaction with and bonding to the microporous membrane substrate.

Suitable secondary and ditertiary amines include, but are not limited to N,N,N',N'-tetramethylethylenediamine, N,N,N',N'-tetraethylethylenediamine, N,N,N',N'-tetramethyl-1,3-butanediamine, N,N,N',N'-tetraethyl-1,3-butanediamine, N,N,N',N'-tetramethyl-1,4-butanediamine, N,N,N',N'-tetraethyl-1,4-butanediamine, N,N'-dimethylpiperazine, N,N'-diethylpiperazine, 1,4-diazabicyclo(2,2,2)octane, 4,4'-dipyridyl, N,N,N', N'-tetramethylbenzidine, N,N,N',N'-tetraethylbenzidine, oxy-bis-2,2(N,N-dimethylethylamine), 4,4-bis(dimethylaniline), N,N,N',N'-tetrakis(hydroxyethyl) ethylenediamine, N,N,N',N'-tetrakis(hydroxypropyl) ethylenediamine, N,N,N',N'-tetramethyl-2-butenediamine, N,N,N',N'-tetramethyl-1,6-hexanediamine, bis (dimethylaminomethyl) benzenes, bis(dimethylaminoethyl) toulenes, bis(dimethylaminoethyl) xylenes, dimethylamine, diethylamine, diisopropylamine, dibutylamine, diethanolamine, diisopropanolamine, piperidine, morpholine, 2,6-dimethyl-morpholine, 1,2,4-trimethylpiperazine, and 1,4-bis(2-hydroxypropyl)-2-methylpiperazine.

Among the preferred reactants are the N,N,N',N'-tetra-($C_1$-$C_4$ alkyl) alkyl diamines having 1 to 10 carbon atoms between the substituted amine groups. More preferred is N,N,N',N'-tetramethyl-1,6-hexanediamine and N,N,N',N'-tetraethyl-1,6-hexanediamine.

Included as well, however, are compounds having the general formula:

where M is a reactive moiety-containing group such as hydroxy, amino, carboxy, epoxy, halo, or aldehyde. Typically, M may be CHOH, pyridine, $C_6H_3OH$, $C_6H_4$—CHOH—$C_6C_4$ and $R^3C_6H_2OH$, with $R^3$ as described above.

Typical reactions for the synthesis of the polyionenes are bonded to the microporous membrane substrate are as follows:

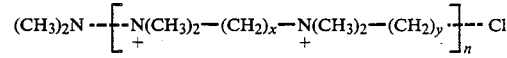

where n is a whole number integer and x and y are whole number integers. These polyionenes have a molecular weight in the range of 10,000 to 100,000.

Where, for example, x is 6 and y is 6, the resulting product is a 6,6-polyionene having the general formula:

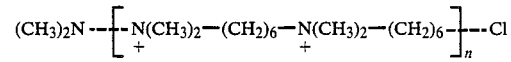

where x is 6 and y is 10, the resulting product is a 6,10-polyionene having the general formula:

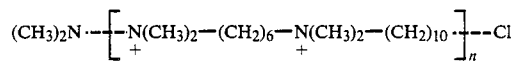

Also contemplated are the reaction products wherein a mixture of dihalo compounds are used, for example, where Cl—$(CH_2)_6$—Cl and Cl—$(CH_2)_{10}$—Cl are reacted with a secondary or ditertiary diamine, yielding a product having the general formula:

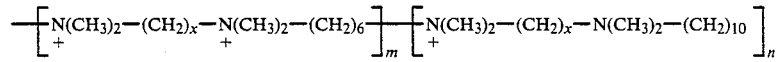

where m and n are whole number integers.

The last above concept is especially useful where it is desirable to synthesize polyionenes which contain reactive groups, i.e. hydroxyl groups. A typical reaction is as follows:

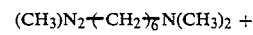

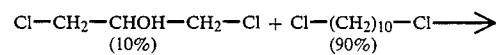

-continued

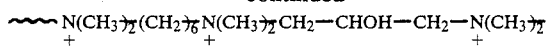

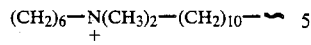

Similarly, reactive group-containing polyionenes may be obtained from the following reaction:

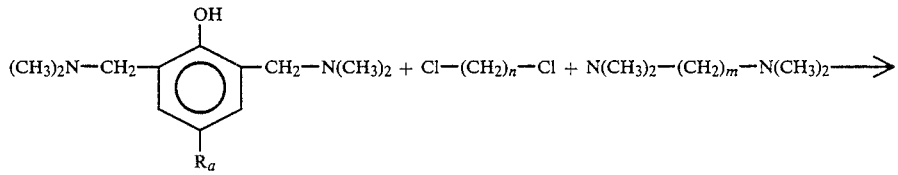

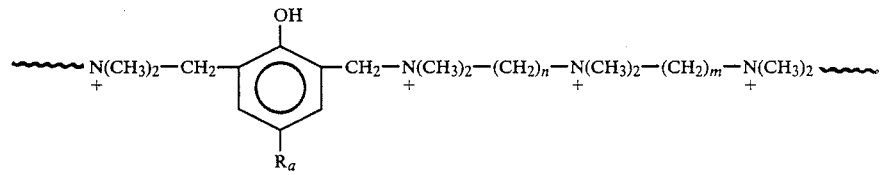

where $R_a$ is, for example, $C_1$-$C_4$ alkyl.

By reacting the pendant reactive group with, for example, epichlorohydrin, the polyionene may be restructured to contain epoxy groups, said epoxy groups themselves useful for bonding to the membrane substrate.

Another manner for creating reactive sites on the polyionene for subsequent bonding is as follows:

reacted with a suitable hydrophobic spacer arm, for example $NH_2$—$(CH_2)_3$—$NH$—$(CH_2)_3$—$NH_2$, to yield a reaction product with an amine terminated linker arm:

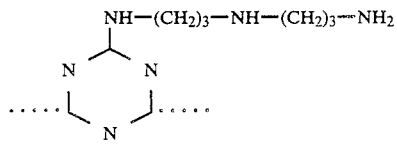

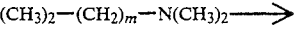

said amine terminated linker arm may subsequently be reacted with functional groups on the membrane to thereby bond the polyionene to the substrate.

An alternative procedure for creating reactive groups, i.e. hydroxy groups, on the polyionene is as follows:

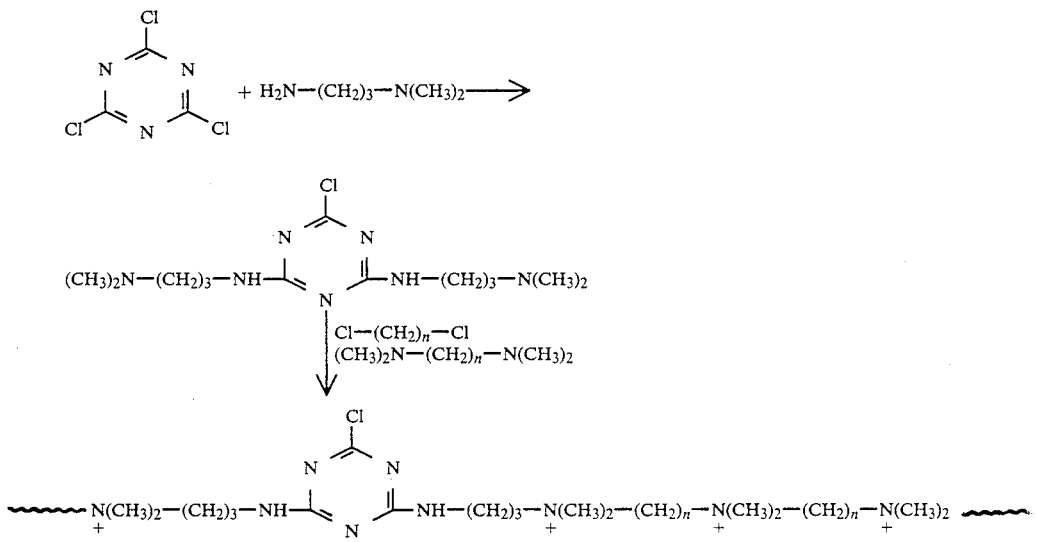

The resulting polyionene, containing a substituted halide (chloride) in the heterocyclic ring, may then be

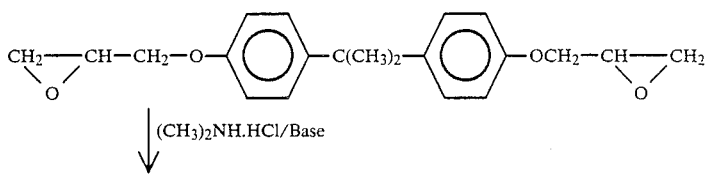

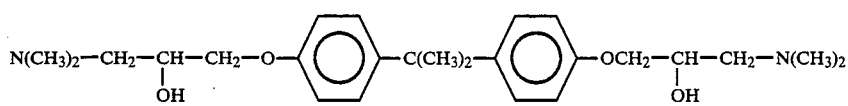

This product may be reacted with dihalo organic compounds and ditertiary diamines to produce a polyionene containing reactive groups. Reaction of that product with, for example, epichlorohydrin, results in epoxidation of the polyionene as above.

Another method for producing reactive group containing polyionenes is as follows:

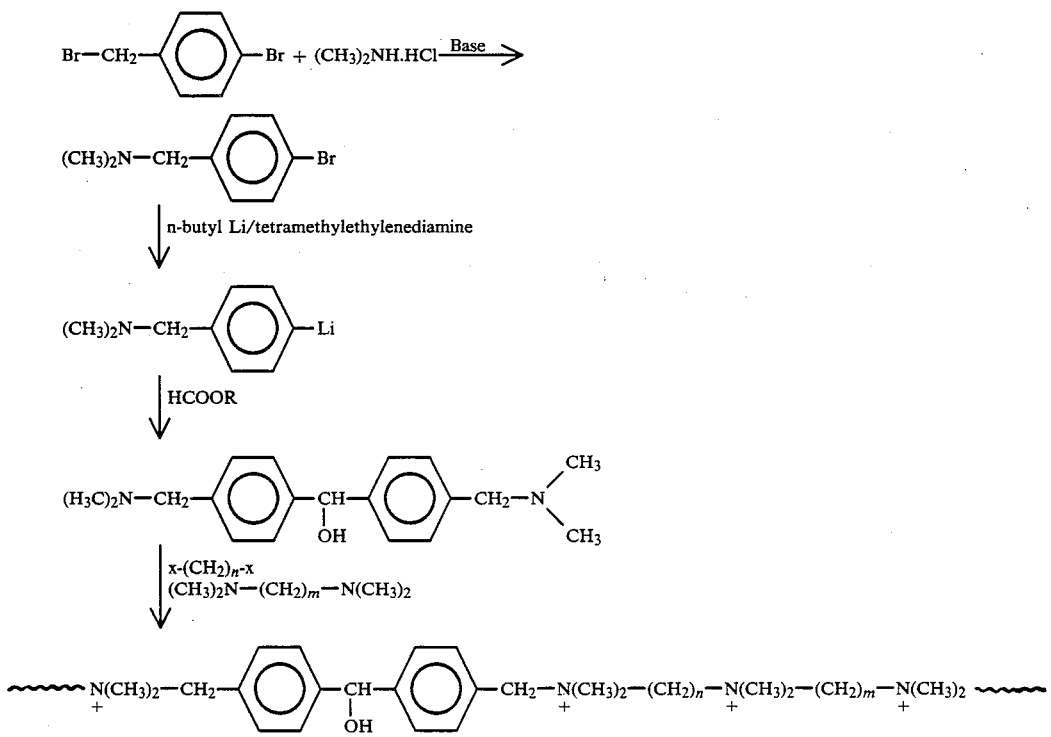

Further, a mixture of ditertiary diamines and a reactive group-containing ditertiary diamine, for example, 1,3-bis-(dimethylamino)-2-propanol may be reacted with a dihalo compound as follows:

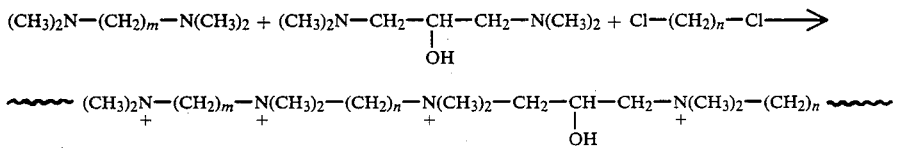

As above, the reactive group may then be reacted with, for example, epichlorohydrin to produce an epoxidized derivative for bonding purposes.

By the term "polyionene-transformed microporous membrane" and "polyionene-transformed membrane" is meant to include any and all of the above-described microporous membranes which have been transformed by the presence of a polyionene bonded to or modifying substantially all of the wetted surfaces of said membrane. In one embodiment, the polyionene is covalently coupled to the microporous membrane microstructure through the reactive coupling groups induced on the polyionene. The coupling process substantially improves the resistance of the polyionene-transformed membrane to leaching during use thereof.

By the term "bonding" or "bonded" is intended that the polyionene is sufficiently attached to the microporous membrane that the polyionene will not significantly be extracted under the intended conditions of use. This attachment includes both chemical attachment through covalent coupling between reactive sites on the membrane and the polyionene and chemicao-physical and physical bonding as well.

By the term "substantially all of the wetted surface" is intended all of the external surface and internal pore surfaces which are wetted by a fluid pass through the membrane or in which the membrane is immersed.

Preparation of the polyionene-transformed microporous membranes proceeds generally as follows. Microporous membrane is prepared using a procedure such as that described by U.S. Pat. No. 3,876,738 to Marinaccio et al. or U.S. Pat. No. 4,340,479 to Pall. Generally, the microporous membrane is prepared by a process comprising preparing a doped solution of a nylon polymer in a solvent system comprising a mixture of at least one solvent and one non-solvent for the polymer. The amount of non-solvent should be no greater than the amount required to induce nucleation of the solution to obtain a visible precipitate. A typical solvent is formic acid; a typical non-solvent is methanol, methylformate, water or glycerol. The solution of polymer is cast directly under the surface of a quenching bath comprising a non-solvent for the polymer for a time sufficient to form micropores in the film, a typical non-solvent system being a mixture of methanol and water or formic acid and water.

The thus-formed microporous membrane may be transformed with polyionene using two basic procedures. Where the transforming polyionene is absent reactive groups, for example, using a 6,10-polyionene, the polyionene may be directly added to a liquid bath containing a diepoxide and a diamine, at alkaline pH. Following immersion of the membrane in the bath, the membrane is dried at approximately 120° C. to complete the cross-linking reaction which binds the polyionene to the membrane.

Alternatively, where coupling groups such as epoxy, hydroxyl and amino are previously introduced to the polyionene backbone, no additive or cross-linking agent need be added to the bath. The polyionene may be bonded to the membrane structure by pH activation, followed by temperature curing.

By the term "microorganism-originated contaminants" or "contaminants of microorganism origin" is meant to include bacteria, bacterial products such as endotoxins, viruses, micoplasma, and the like.

By the term "biological liquids" is meant to include each and every liquid system which is derived from or amenable to use with living organisms. Such liquids are ordinarily handled and processed under sanitary or sterile conditions and therefore require sanitized or sterilized media for filtration. Included within such terms are isotonic solutions for intramuscular or intravenous administration, solutions designated for oral administration, solutions for topical use, biological wastes or other biological fluids which may comprise filterable bodies such as impurities, e.g. bacteria, viruses, or endotoxins which are desirably isolated or separated for examination or disposable by immobilization or fixation upon or entrapment within separation media.

Separation membranes in accordance with this invention may be employed alone or in combination with other separation media to treat pharmaceuticals such as antibiotics, saline solutions, dextrose solutions, vaccines, blood plasma, serums, sterile water or eye washes; beverages such as cordials, gin, vodka, beer, scotch, whiskey, sweet and dry wines, champagne or brandy; cosmetics such as mouthwash, perfume, shampoo, hair tonic, face cream, or shaving lotion; food products such as vinegar, vegetable oils; chemicals such as antiseptics, insecticides, photographic solutions, electroplating solutions, cleaning compounds, solvent purification and lubrication oil; and the like, where retention of submicronic particles, removal of bacterial contaminants and resolution of colloidal hazes is desired. The membranes may be used to isolate blood parasites from peripheral blood and also to remove microorganism-originated contaminants from peripheral blood. Included among the contemplated utilities are the use of the membranes for separating contaminants from blood to be used for re-infusion.

The polyione-transformed membranes of this invention may be utilized as the separation media in any and all of the separation devices conventional and well-known in the art, including, but not limited to, devices such as are described in U.S. Pat. Nos. 4,113,627; 4,444,661; 4,148,732; 4,170,056; and 4,159,954, incorporated by reference herein, and application Ser. No. 703,691, filed Apr. 16, 1985, by Rai et al., also incorporated herein by reference.

In one preferred embodiment, the separation device comprises an apparatus and separation media comprising that configured as in International Publication No. WO 83/04186 to Meyerling et al., published Dec. 8, 1983, and incorporated by reference herein. Thus, this separation device comprises a housing and a polyionene-transformed separation membrane, said separation membrane being in cylindrical form and having a substantially non-porous area at each end of the cylinder, optionally sandwiched between inner and outer layers of, for example, a support member such as a woven netting of polypropylene.

The separation media in cylindrical form is pleated transversely to its length and surrounds a foraminous cylindrical core member which is provided with apertures for flow into the open interior of the core. This unit is in turn surrounded by a cylindrical outer member which is also provided with apertures. The ends of the entire unit comprising the cylindrical core member, transversely pleated separation membrane, and cylindrical outer member are capped by end caps which are sealed to the separation membrane, thus closing off the interior from the exterior of the separation device, thereby insuring that the biological liquids introduced into the separation device pass through the separation media prior to exiting the separation device.

Having now generally described this invention, the same will become better understood by reference to certain specific examples, which are included herein for the purposes of illustration only and are not intended to be limiting unless otherwise specified.

EXAMPLE 1

Preparation of Microporous Membrane

A representative Nylon 66 membrane of 0.22 micrometer nominal rating, having a nominal surface area of about 13 m$^2$/g, IBP of about 47 psi, and a Foam-All-Over-Point of about 52 psi was prepared by the method of Marinaccio et al., U.S. Pat. No. 3,876,738, utilizing a dope composition of 16% by weight Nylon 66 (Monsanto Vydyne 66B), 7.1% methanol and 76.9% formic acid, a quench bath composition of 25% methanol, 75% water by volume (regenerated as required by the method of Knight et al., U.S. Pat. No. 3,928,517), a casting speed of 24 in/min (61 cm/min), and a quench bath temperature of 20° C. The membrane was cast just under the surface of the quench bath by application to a casting drum rotating in the bath (9 to 10 mils as cast wet to obtain 4.5-5.5 mils dry) and allowed to separate from the drum about 90° of arc from the point of application, the self-supporting membrane forming a shallow catenary to take-up. A portion of the uniform opaque film was dried (in restrained condition to resist shrinkage) in a forced air oven at 80°-90° C. for 30 minutes.

EXAMPLE 2

Preparation of Charge Modified Microporous Membrane

1. Membrane samples (dried and undried) were dipped in a bath of Hercules 1884 polyamido-polyamine epichlorohydrin resin (4% solids by weight), and allowed to attain adsorption equilibrium. The treated membrane samples were washed to remove excess resin and dried in restrained condition on a drum at a temperature at 100° C. for a period of about 3 minutes.

The treated membrane samples were compared for flow and bubble point characteristics as follows, and found to be essentially identical for treated and untreated samples, evidencing retention of pore and surface geometry. The results are set forth in Table I.

TABLE 1

|  | Control (No treatment) | Undried Membrane | Dried Membrane |
|---|---|---|---|
| Thickness (mils) | 4.25 | 4.58 | 4.83 |
| Initial Bubble Point (psi) | 43.7 | 44.7 | 44.7 |
| Foam-All-Over-Point (psi) | 55.0 | 54.0 | 54.7 |
| Thickness Normalized Flow Rate (cc. mil/min. cm² psi) | 7.1 | 7.2 | 7.0 |
| BET, N₂ Adsorption | 13.2 | — | 13.58 |

Thus, in terms of the morphological and hydrodynamic parameters that control mechanical sieving, the filtration characteristics of the treated membranes were essentially identical with the untreated nylon membrane.

2. Similar characterizations were conducted on another membrane sample, similarly prepared but treated with 2% Hercules R4308 resin (a free radical polymerized resin based upon diallyl nitrogen-containing materials, reacted with epichlorohydrin) in a bath adjusted to pH 10.5, overcoated with 0.1% tetrathylene pentamine, dried, cured, washed and redried. The results are set forth in Table 2.

TABLE 2

|  | Control (No Treatment) | Dried Membrane |
|---|---|---|
| Tensile Strength (psi) |  |  |
| Wet | 528 | 635 |
| Dry | 860 | 960 |
| Elongation (%) |  |  |
| Wet | 140 | 100 |
| Dry | 95 | 40 |

Surface area of the treated and untreated membranes remained essentially unchanged; tensile strength increased with treatment with some loss in elongation. The treated sheet was more flexible; creasing of the untreated sheet resulted in cracking and splitting.

EXAMPLE 3

Polyionene with OH Groups as Coupler

Case A: Introducing OH through Amine Monomers

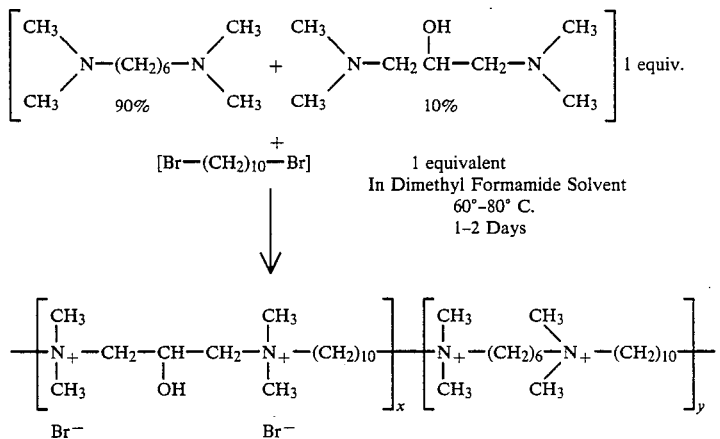

This OH group will serve as coupler to be linked on to membrane structure. If reacted with epichlorohydrin, an epoxy group will replace the hydroxyl based on the following reaction;

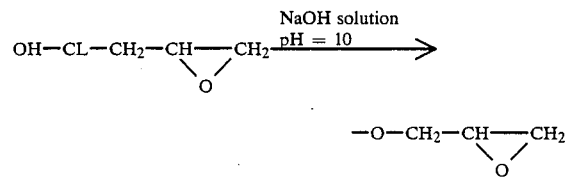

Case B: Introducing OH through Halide Monomers

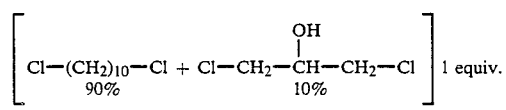

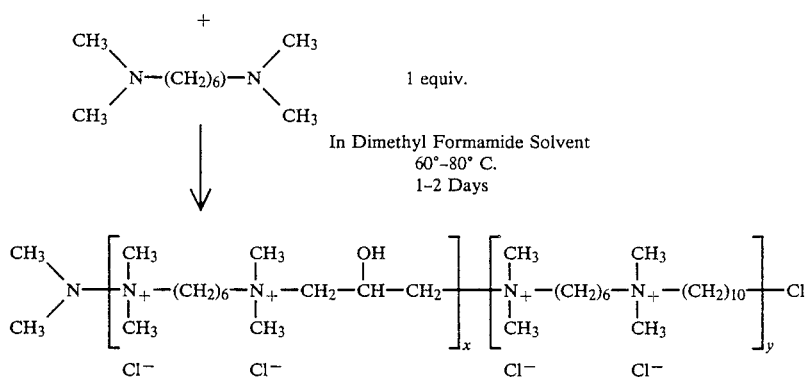
The polymer was precipitated out from the DMF solvent form acetone and washed with acetone and stored in powder form.
The coupling group will link to the amino terminal groups in nylon membrane.
EXAMPLE 4
Polyionene with Chloro Groups as Coupler
EXAMPLE 5
Polyionene with Aldehyde or Amino Groups as Coupler
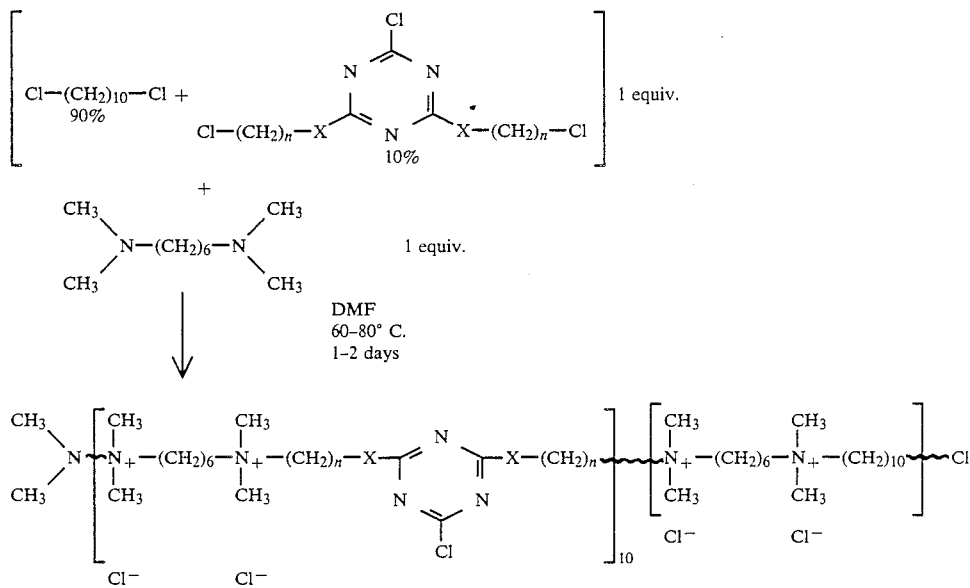
where n = 0, 1, 2, ...
X = —O— or —N—
          |
          H
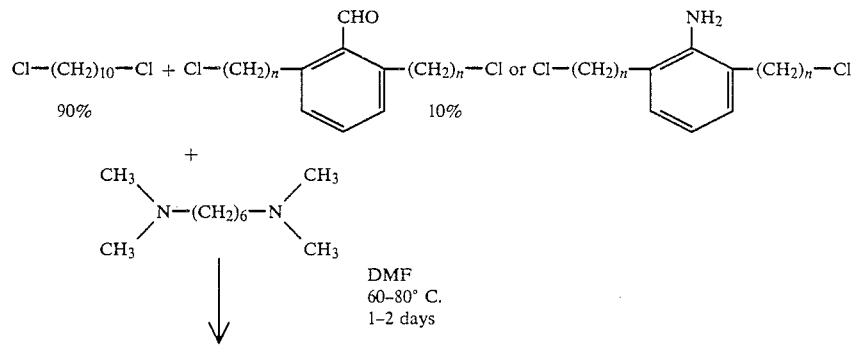
DMF
60–80° C.
1–2 days

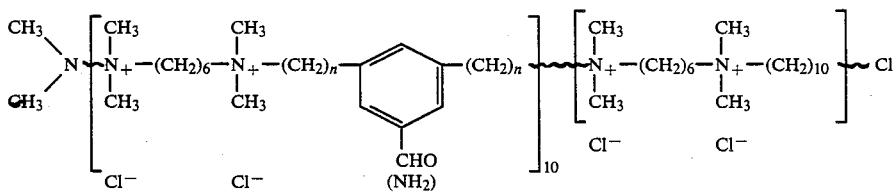

If aldehyde is used as coupler, 0.01 to TEPA may be added in the dipping bath; glutaraldehyde may be added in the case of arylamino as coupler. The arylamino groups can also be converted to a more active form, such as diazol type through reaction with nitrous acid (NaNO$_2$HCl).

EXAMPLE 6

Polyionene Carrying Vinyl Groups for Grafting

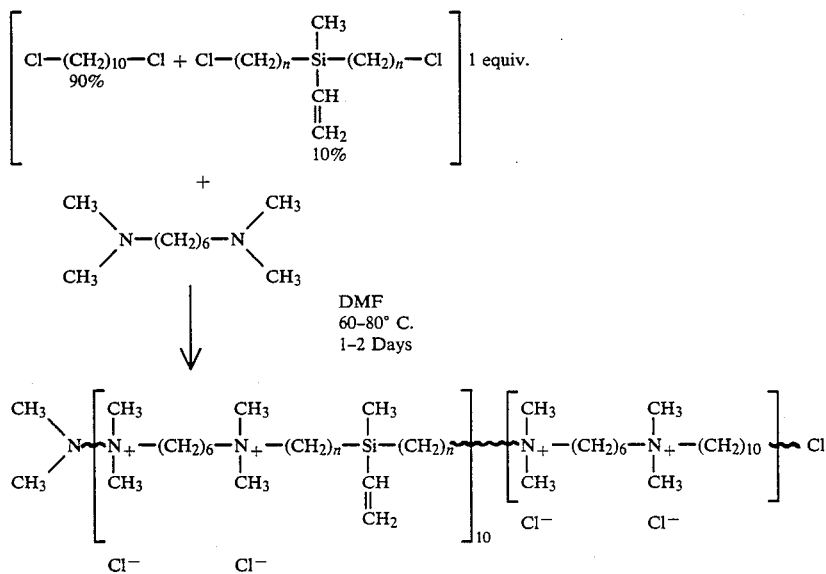

With the introduction of vinyl groups to polyionene, the polymer may be grafted by the free radical reaction to the nylon membrane.

EXAMPLE 7

A 6,10-polyionene was directly added to a liquid bath containing 0.38% 1,4-butane diol di-epoxide and 0.08% tetraethylene pentamine in 5 to 10% concentration at pH 10.0, adjusted by 5 normal sodium hydroxide solution. The membrane of Example 2 was introduced into the bath of mixed reagents at an angle of 30% from the horizontal to prevent bubble entrapment in the membrane which can prevent the chemical reagents from diffusing into the membrane. The membrane was treated in this bath at a speed of 2.5 ft. per minute for a length of 4 feet. The membrane was then wrapped around a take-up roll and stored for at least 3 hours. The roll was then dried at 250° F. (120° C.) for 3 minutes to complete the cross-linking reaction and the binding of the polyionene to the membrane.

EXAMPLE 8

Bactericidal Test

1. Results showing the inhibition of bacteria growth:

(a) Membrane material tested:
  (A) Control: 0.65 micro nylon membrane prepared as in Example 1, without further treatment.
  (B) The charge-modified nylon membrane coated with 6,10 polyionene according to the coating process of Example 7.
  (C) The charge-modified nylon membrane grafted with polyionene according to method of Example 7.

(b) Testing procedure:
  (1) Membranes were cut into 13 mm disk form and put in the Millipore-type membrane holder.
  (2) The disks were washed with 5 ml saline solution, then injected with 5 ml of PPBE solution containing $5.5 \times 10^7$ Salmonella typhimurium cells per ml through the membrane by syringe.
  (3) The membrane was rinsed again with 5 ml physiological saline solution.
  (4) The membrane was taken away from the holder and out in sterilized tubes containing 5 ml of PPBE bacteria growth media each, the tubes numbered as follows:
  Tube #1: Membrane disks in 5 ml PPBE media
  Tube #2: Membrane disks in 5 ml PPBE media, 1 ml of starting solution containing $5.5 \times 10^7$ bacterial cells additional
  Tube #3: Same as Tube #1 except the disks were mixed in media with 5 minutes Vortex agitation
  Tube #4: Same as Tube #2 except the tubes were mixed with 5 minutes Vortex agitation.

(c) Testing results:
The bacteria concentration was monitored by measuring O.D. at wavelength 600 nm of the PPBE media solution. O.D. of the starting solution =0.11 corresponding to $5.5 \times 10^7$ cell per ml. The results are reported at Table 3.

TABLE 3

| Tube No. | Membrane Type | Filtrate | O.D.$_{600}$ Readings After 4 hrs. | After 20 hrs. | Observation of Results |
|---|---|---|---|---|---|
| 1 | (A) Control of 0.65 micron membrane | 0.07 | 2.23 | — | Bacteria physically entrapped on membrane grow quickly in 4 hrs. |
| 2 | | 0.07 | 2.43 | — | |
| 3 | | 0.07 | 2.09 | — | |
| 4 | | 0.07 | 2.31 | — | |
| 1 | (B) Charge-modified membrane coated with polyionene | 0.05 | 0.031 0.024 | 0.028 0.027 | No growth and showing the bacteriocidal effect |
| 2 | | 0.05 | 0.040 0.024 | 0.036 0.034 | |
| 3 | | 0.05 | 0.022 0.022 | 0.027 0.039 | |
| 4 | | 0.05 | 0.049 0.055 | 0.133 0.175 | Showing slight growth |
| 1 | (C) Charge-modified membrane grafted with polyionene | 0.04 | 0.020 0.017 | 0.019 0.021 | Better results than coated membrane |
| 2 | | 0.04 | 0.037 0.041 | 0.034 0.032 | |
| 3 | | 0.04 | 0.017 0.019 | 0.018 0.018 | |
| 4 | | 0.04 | 0.054 0.052 | 0.061 0.064 | |

EXAMPLE 9

Effect of Membrane Pore Size on Bacteria (a) Membrane material tested:
 (A) 0.065 micron nylon membrane prepared as in Example 1, without further treatment.
 (B) 0.065 micron nylon membrane coated with 6,10-polyionene as in Example 7.
 (C) 0.22 micron nylon membrane, prepared as in Example 1, without further treatment.
 (D) 0.022 micron nylon membrane coated with 6,10-polyionene as in Example 7.

(b) Bacteria strain challenged.
 *Pseudomonas diminuta* were grown in saline lactose broth at 37° C. overnight. The cells grew slowly and relatively smaller in size as compared to the *Salmonella typhimurium* cells. The cell concentration was measured at O.D.$_{550}$; reading of 0.11 at O.D$_{550}$ corresponds to $2.2 \times 10^7$ cells per ml.

(c) Testing procedure:
 (1) 25 mm size membranes were cut and inserted in the membrane holders.
 (2) The membranes were washed with 10 ml physiological saline solution.
 (3) The *Pseudomonas diminuta* in their growth media were pumped through membranes A, B, C and D with a peristatic pump at the rate of 2 ml/min.
 (4) The filtrates were collected with a fraction collector of 5 ml per fraction and the successive fractions collected were measured at O.D.$_{550}$ to determine bacteria concentration.

(d) Test results are reported at Table 4.

TABLE 4

| Membrane Type | Fraction Collected | O.D.$_{550}$ Reading Original | Filtrates | % Bacterial Removal |
|---|---|---|---|---|
| A. 0.65 micron membrane | 1 | 0.11 | 0.25 | 77 |
| | 2 | 0.11 | 0.28 | 75 |
| | 3 | 0.11 | 0.030 | 73 |
| | 4 | 0.11 | 0.030 | 73 |
| | 5 | 0.11 | 0.035 | 68 |
| | 6 | 0.11 | 0.035 | 68 |
| | 7 | 0.11 | 0.040 | 63 |
| | 8 | 0.11 | 0.045 | 59 |
| B. A + polyionene | 1 | 0.11 | 0.0 | 100 |
| | 2 | 0.11 | 0.0 | 100 |
| | 3 | 0.11 | 0.0 | 100 |
| | 3 | 0.11 | 0.0 | 100 |
| | 4 | 0.11 | 0.001 | 99 |
| | 5 | 0.11 | 0.001 | 99 |
| | 6 | 0.11 | 0.001 | 99 |
| | 7 | 0.11 | 0.002 | 98 |
| | 8 | 0.11 | 0.002 | 98 |
| C. 0.22 micron membrane | 1 | 0.11 | 0.014 | 87 |
| | 2 | 0.11 | 0.012 | 89 |
| | 3 | 0.11 | 0.012 | 89 |
| | 4 | 0.11 | 0.014 | 87 |
| | 5 | 0.11 | 0.015 | 86 |
| | 6 | 0.11 | 0.016 | 85 |
| | 7 | 0.11 | 0.017 | 84 |
| | 8 | 0.11 | 0.018 | 83 |
| D. 0.22 micron membrane + polyionene | 1 | 0.11 | 0.0 | 100 |
| | 2 | 0.11 | 0.0 | 100 |
| | 3 | 0.11 | 0.0 | 100 |
| | 4 | 0.11 | 0.0 | 100 |
| | 5 | 0.11 | 0.0 | 100 |
| | 6 | 0.11 | 0.0 | 100 |
| | 7 | 0.11 | 0.0 | 100 |
| | 8 | 0.11 | 0.0 | 100 |

As may be seen from Table 4, the polyionene-coated membrane filters have superior bacteriocidal properties as compared to the non-coated membrane filters. Further, the 0.22 micron membrane, coated with 6,10-polyionene, removed 100% of the Pseudomonas bacteria pumped through it.

Having now fully described this invention, it will be appreciated by those of skill in the art that many modifications and variations exist which do not affect or change the scope thereof.

WHAT IS CLAIMED AS NEW AND IS DESIRED TO BE COVERED BY LETTERS PATENT IS:

1. A modified microporous membrane comprising a polyionene-transformed hydrophilic organic polymeric microporous membrane having bonded thereto an amount of polyionene effective to adsorb and inactivate contaminants of microorganism origin.

2. The modified membrane of claim 1 wherein said polyionene comprises a water-soluble polymer having polycauternary ammonium groups separated by hydrophobic groups.

3. The modified microporous membrane of claim 1 wherein said polyionene comprises a polymer having the following repeating units:

$$R_2^1 \overset{+}{N} - L - R_2^2 \overset{+}{N} - M$$

wherein $R^1$ and $R^2$ are $C_1$–$C_4$ alkyl; L is $-(CH_2)_n - P - (CH_2)_m$; M is $-(CH_2)_o - Q - (CH_2)_p-$, with P and Q being the same or different and representing at least one of $CH_2$, CHA, pyridine, $C_6H_4$, $C_6H_3A$, $C_6H_4 - CHA - C_6H_4$ or $R_3C_6H_2A$ wherein $R_3$ is $C_1$–$C_4$ alkyl; m, n, o and p representing integers from 1 to 20;

and A represents a reactive group selected from hydroxy, carboxyl, halo, amino, epoxy and aldehyde.

4. The modified microporous membrane of claim 3 wherein $R^1$ and $R^2$ are methyl, L is $(CH_2)_6$ and M is at least one of $(CH_2)_{10}$ and a mixture of $(CH_2)_{10}$ and $CH_2—CHOH—CH_2$.

5. The modified microporous membrane of claim 1 wherein said hydrophilic organic polymeric microporous membrane is coated with said polyionene.

6. The modified microporous membrane of claim 1 wherein said hydrophilic organic polymeric microporous membrane is covalently bonded to said polyionene.

7. The modified microporous membrane of claim 1 wherein said hydrophilic organic polymeric microporous membrane is nylon.

8. A modified microporous membrane comprising a symmetrical, isotropic, porous hydrophilic organic polymeric microporous membrane having bonded to substantially all of the wetted surfaces thereof an amount of polyionene effective to adsorb and inactivate contaminants of microorganism origin, wherein said polyionene comprises a water-soluble polymer having polyQuaternary ammonium groups separated by hydrophobic groups.

9. The modified microporous membrane of claim 8 wherein said polyionene comprises a polymer having the following repeating units:

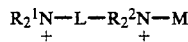

wherein $R^1$ and $R^2$ are $C_1$-$C_4$ alkyl; L is $—(CH_2)_n—P—(CH_2)_m$; M is $—(CH_2)_o—Q—(CH_2)_p—$, with P and Q being the same or different and representing at least one of $CH_2$, CHA, $C_6H_4$, pyridine, $C_6H_3A$, $C_6H_4—CHA—C_6H_4$, or $R^3C_6H_2A$ wherein $R^3$ is $C_1$-$C_4$ alkyl; m, n, o and p representing integers from 1 to 20; and A represents a reactive group selected from hydroxy, carboxyl, halo, amino, epoxy and aldehyde.

10. The modified microporous membrane of claim 9 wherein $R^1$ and $R^2$ are methyl, L is $(CH_2)_6$ and M is at least one of $(CH_2)_{10}$ and a mixture of $(CH_2)_{10}$ and $CH_2—CHOH—CH_2$.

11. The modified microporous membrane of claim 8 wherein said hydrophilic organic polymeric microporous membrane is nylon.

12. A method for separating and inactivating microorganism-originated contaminants from a biological liquid comprising passing said biological liquid through a polyionene-transformed hydrophilic organic polymeric microporous membrane having bonded thereto an amount of polyionene effective to adsorb and inactivate contaminants of microorganism origin.

13. The method of claim 12 wherein said polyionene comprises:

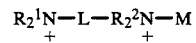

wherein $R^1$ and $R^2$ are $C_1$-$C_4$ alkyl; L is $—(CH_2)_n—P—(CH_2)_m$; M is $—(CH_2)_o—Q—(CH_2)_p—$, with P and Q being the same or different and representing at least one of $CH_2$, CHA, $C_6H_4$, pyridine, $C_6H_3A$, $C_6H_4—CHA—C_6H_4$, or $R^3C_6H_2A$ wherein $R^3$ is $C_1$-$C_4$ alkyl; and m, n, o and p representing integers from 1 to 20; and A represents a reactive group selected from hydroxy, epoxy, carboxy, amino, halo or aldehyde.

14. The method of claim 12 wherein $R^1$ and $R_2$ are methyl.

15. A method for separating microorganism-originated contaminants from a biological liquid comprising passing said biological liquid through a modified microporous membrane comprising a hydrophilic organic polymeric microporous membrane having bonded to substantially all the wetted surfaces thereof an amount of polyionene effective to adsorb and inactivate contaminants of microorganism origin, said polyionene comprising a water-soluble polymer having polyquaternary ammonium groups separated by hydrophobic groups.

16. The method of claim 15 wherein said polyionene comprises a polymer having the following repeating units:

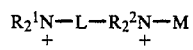

wherein $R^1$ and $R^2$ are $C_1$-$C_4$ alkyl; L is $—(CH_2)_n—P—(CH_2)_m$; M is $—(CH_2)_o—Q—(CH_2)_p—$, with P and Q being the same or different and representing at least one of $CH_2$, CHA, $C_6H_4$, pyridine, $C_6H_3A$, $C_6H_4—CHA—C_6H_4$, or $R^3C_6H_2A$ wherein $R^3$ is $C_1$-$C_4$ alkyl; m, n, o and p representing integers from 1 to 20; and A represents a reactive group selected from hydroxy, carboxyl, halo, amino, epoxy and aldehyde.

17. The process of claim 15 wherein an $R^1$ and $R^2$ are methyl, L is $(CH_2)_6$ and M is at least one of $(CH_2)_{10}$ and a mixture of $(CH_2)_{10}$ and $CH_2—CHOH—CH_2$.

18. A separation device comprising a housing and a separation medium wherein said separation medium comprises a polyionene-transformed hydrophilic organic microporous membrane having bonded thereto an amount of polyionene effective to adsorb and inactive contaminants of microorganism origin.

19. The separation device of claim 18, wherein said polyionene comprises a water-soluble polymer having polyquaternary ammonium groups separated by hydrophobic groups.

20. The separation device of claim 18, wherein said polyionene comprises a polymer having the following repeating units:

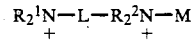

wherein $R^1$ and $R^2$ are $C_1$-$C_4$ alkyl; L is $—(CH_2)_n—P—(CH_2)_m$; M is $—(CH_2)_o—Q—(CH_2)_p—$, with P and Q being the same or different and representing at least one of $CH_2$, CHA, pyridine, $C_6H_4$, $C_6H_3A$, $C_6H_4—CHA—C_6H_4$, or $R^3C_6H_2A$ wherein $R^3$ is $C_1$-$C_4$ alkyl; m, n, o and p representing integers from 1 to 20; and A represents a reactive group selected from hydroxy, carboxyl, halo, amino, epoxy and aldehyde.

21. The separation device of claim 18 wherein said microporous membrane is nylon.

22. The separation device of claim 18 wherein said microporous membrane is coated with said polyionene.

23. The separation device of claim 18 wherein said microporous membrane is covalently bonded to said polyionene.

24. The separation device of claim 18 wherein said separation medium comprises a cylinder which is pleated over its entire length and wherein said housing comprises a foraminous cylindrical core member, a foraminous cylindrical outer member and two end caps, said separation medium interposed between said foraminous cylindrical core member and said foraminous cylindrical outer member and sealed to each of said end caps.

25. A method for producing a microporous membrane comprising modifying said membrane with an amount of polyionene, said amount being effective to adsorb and inactivate contaminants of microorganism origin.

26. The method of claim 25 wherein said microporous membrane is coated with said polyionene.

27. The method of claim 25 wherein said microporous membrane is grafted with said polyionene.

28. The method of claims 25, 26 or 27 wherein said polyionene comprises a water-soluble polymer having polyquaternary ammonium groups separated by hydrophobic groups.

29. The method of claim 28 wherein said polyione comprises a polymer having the following repeating units:

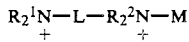

wherein $R^1$ and $R^2$ are $C_1$-$C_4$ alkyl; L is $-(CH_2)_n-P-(CH_2)_m$; M is $-(CH_2)_o-Q-(CH_2)_p-$, with P and Q being the same or different and representing at least one of $CH_2$, CHA, pyridine, $C_6H_4$, $C_6H_3A$, $C_6H_4-CHA-C_6H_4$, or $R^3C_6H_2A$ wherein $R^3$ is $C_1$-$C_4$ alkyl; m, n, o and p representing integers from 1 to 20; and A represents a reactive group selected from hydroxy, carboxyl, halo, amino, epoxy and aldehyde.

* * * * *